United States Patent
Verbowski

(10) Patent No.: US 9,527,360 B2
(45) Date of Patent: Dec. 27, 2016

(54) REFURBISHMENT ASSEMBLY FOR HEAVY DUTY CHASSIS AND METHOD

(71) Applicant: Larry John Verbowski, Bay City, MI (US)

(72) Inventor: Larry John Verbowski, Bay City, MI (US)

( * ) Notice: Subject to any disclaimer, the term of this patent is extended or adjusted under 35 U.S.C. 154(b) by 77 days.

(21) Appl. No.: 14/445,601

(22) Filed: Jul. 29, 2014

(65) Prior Publication Data
US 2016/0031277 A1 Feb. 4, 2016

(51) Int. Cl.
*B60G 13/00* (2006.01)
*B60G 9/00* (2006.01)

(52) U.S. Cl.
CPC .......... *B60G 13/005* (2013.01); *B60G 9/003* (2013.01); *B60G 2200/31* (2013.01); *B60G 2204/129* (2013.01); *B60G 2204/45* (2013.01); *B60G 2204/61* (2013.01)

(58) Field of Classification Search
CPC .............. B60G 3/02; B60G 3/18; B60G 3/20; B60G 9/02; B60G 9/022; B60G 9/90; B60G 2200/31; B60G 2204/4306
USPC ...................... 280/124.116, 124.11
See application file for complete search history.

(56) References Cited

U.S. PATENT DOCUMENTS

| | | | | |
|---|---|---|---|---|
| 3,272,493 A | * | 9/1966 | Bourcier De Carbon | B60G 13/005 267/221 |
| 3,713,663 A | * | 1/1973 | Granning | B60G 11/27 267/256 |
| 4,087,115 A | * | 5/1978 | Earle | B60G 3/12 267/221 |
| 4,767,134 A | * | 8/1988 | Booher | B29C 70/52 267/149 |
| 6,845,830 B2 | * | 1/2005 | Tojo | A61G 5/046 180/8.3 |
| 2007/0138755 A1 | * | 6/2007 | Copsey | B60G 9/02 280/124.116 |
| 2014/0306415 A1 | * | 10/2014 | Aldrich | B62D 7/20 280/124.116 |
| 2015/0191064 A1 | * | 7/2015 | Gielisch | B60G 3/145 280/124.129 |
| 2016/0031277 A1 | * | 2/2016 | Verbowski | B60G 9/003 280/124.116 |

* cited by examiner

Primary Examiner — Karen Beck

(57) ABSTRACT

A refurbishment assembly for heavy duty truck chassis and a novel bracket for maintaining said assembly in such chassis including a method of creating or manufacturing such an assembly and its mounting on a heavy duty truck chassis.

3 Claims, 4 Drawing Sheets

REFURBISHMENT ASSEMBLY FOR HEAVY DUTY CHASSIS AND METHOD

BACKGROUND OF THE INVENTION

This application deals with a refurbishment assembly for heavy duty chassis and a novel bracket for maintaining said assembly in a chassis. Also disclosed is a method of creating or manufacturing such an assembly and its mounting on a heavy duty truck chassis.

Heavy duty chassis are common in the art and are attributed to heavy duty trucks generally manufactured by the commercial automobile companies. Such trucks include, for example Ford F250, 350, 450 and 550 four wheel drive solid beam axle trucks and their counterparts manufactured by other automobile manufacturing companies such as general motors, Chrysler and the like.

In an attempt to provide armored cars, or troop carriers that are heavily reinforced with steel for protection, it is necessary to provide a steel shell over a heavy duty chassis. This obviously adds weight to the chassis and the suspension systems for heavy duty trucks are not stout enough to handle all of this added weight, it is necessary to refurbish the heavy duty chassis with extra heavy duty parts.

However, there is a problem with just the simple replacement of heavy duty truck suspension systems with extra heavy duty suspension systems, in that, there is typically not enough room in and around such heavy duty suspension systems to allow the extra heavy duty suspension system components.

For example, when an extra heavy duty coil spring is introduced into a heavy duty truck chassis, there is no longer room for the adjacent shock absorber. Likewise, because an extra heavy duty suspension system also requires a compression bumper stop to absorb the initial shock of bumps and the like because of the extra weight, there is no room to find a placement for such a compression bumper stop.

It is estimated that an armored truck or troop carrier refurbished with the steel will weigh in the neighborhood of about 24,000 pounds, 10,000 pounds resting on the front axle and 14,000 pounds resting on the back axle. Thus, the extra heavy duty components need to be larger and more bulky. This invention overcomes these problems. Applicant is unaware of any like assemblies in the prior art.

THE INVENTION

Thus, what is claimed herein is a refurbishment assembly for heavy duty chassis for heavy duty trucks. The refurbishment assembly comprises, in part, in combination, an extra heavy duty coil spring and an extra heavy duty shock absorber. The extra heavy duty shock absorber has a near end and a distal end and the extra heavy duty shock absorber is pivotally mounted at the near end to a rigidly mounted, set-off support.

The set-off support has a top end and the distal end of the extra heavy duty shock absorber is pivotally mounted to support bars. The support, bars are rigidly mounted to a support plate and the support plate is rigidly mounted to a top chassis beam of a heavy duty truck chassis.

There is a dampener plate having a near end and a distal end, wherein the dampener plate surmounts, at the near end, the top of the set-off support and at the distal end it surmounts a truck solid beam front axle and lies beneath one end of the extra heavy duty coil spring.

There is compression bump stop, the compression bump stop impinges on a top surface of the dampener plate at the near end, and the opposite end of the compression bump stop is securely mounted to a suspension hood of a heavy duty chassis.

The suspension hood is rigidly mounted to the top chassis beam of a heavy truck chassis and the lower heavy duty chassis beam has a near end and a distal end. The near end is pivotally attached to the top chassis beam and the distal end is rigidly attached to the solid beam front axle.

In addition, there is a kit for refurbishing a heavy duty chassis for heavy duty trucks. The kit comprises an extra heavy duty coil spring; an extra heavy duty shock absorber; a set-off support; a dampener plate, and, a compression, bump stop.

Further, there is a method of converting a heavy duty truck chassis to an extra heavy duty truck chassis, the method comprising supporting a top beam of a heavy duty chassis at a predetermined height.

Then, supporting a lower beam of the heavy duty truck chassis such that it can be raised or lowered relative to the height of said top beam, the lower beam having attached to it, a solid beam front axle of a heavy duty truck.

Thereafter, removing any coil spring in said heavy duty chassis and removing any shock absorber from the heavy duty chassis. Thereafter, providing a set-off support and bracket and rigidly mounting the set-off support and bracket to a predetermined position on the axle.

One has to provide a mounting plate for the shock absorber, the mounting plate being rigidly mounted on the upper beam such that there is a predetermined alignment with the set-off support and bracket.

One must provide a compression bumper stop, and mounting the compression bumper stop on a suspension hood of the top beam in the position that was occupied by any initial shock absorber.

One places one end of a mounting plate on a top of the set-off support and bracket and the opposite end on the top of the solid beam front axle, and mounts an extra heavy duty coil spring on the opposite end of the mounting plate and in the suspension hood, in place of the initial coil spring.

Then, mounting art extra heavy duty shock absorber on the set-off support and bracket and mounting the opposite end of the extra heavy duty shock absorber on a mounting plate on the top beam such that the extra heavy duty shock absorber is aligned in a predetermined manner with the extra heavy duty coil spring.

For purposes of this invention, the term "extra heavy duty" means that the components are larger and stouter than current, original equipment for heavy duty trucks.

DETAILED DESCRIPTION OF THE INVENTION

Figure 1:
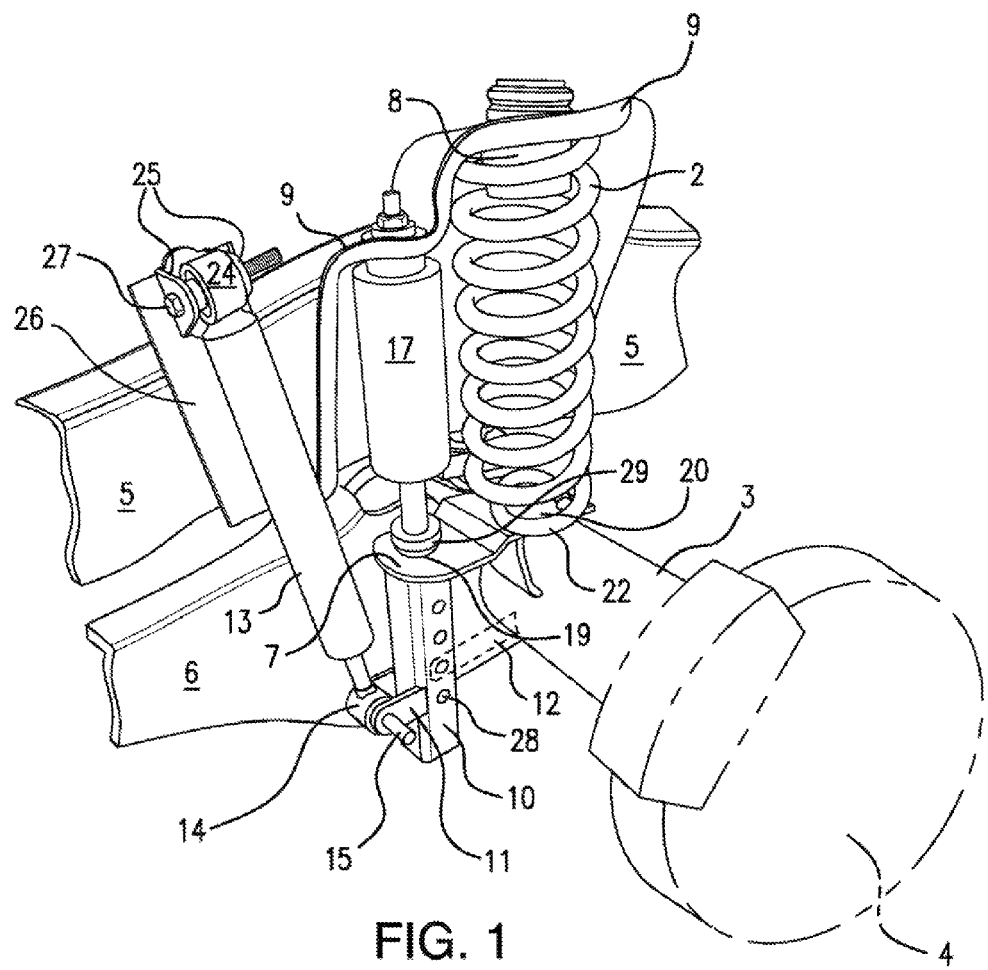
FIG. 1 is a full view of art assembly of this invention showing only a portion of the chassis and axle.

Turning now to FIG. 1, there is shown a full view of an assembly 1 of this invention showing only a portion of the chassis and axle. Shown is an extra heavy duty coil spring 2. This spring, for purposes of this invention is about ¼ to ⅓ longer than a conventional heavy duty coil spring, and the thickness of the steel in the coil is at least twice as thick as conventional heavy duty coil spring material.

Shown is the solid beam front axle 3 and the wheel 4, a top or main beam 5 of the chassis and a lower or pivoting beam 6. The extra heavy duty coil spring 2 is supported on a metal plate 7, which will be disclosed infra, and the metal plate 7, at the end supporting the extra heavy duty coil spring 2 is supported on the solid beam front axle 3. The upper end of the extra heavy duty coil spring 2 is stabilised and supported by a steel cup 8 which is firmly mounted to the suspension shroud 9.

The suspension shroud 9 is bolted or welded directly to the top beam 5 for stabilisation. The suspension shroud 9 is intended to house an extra heavy duty coil spring and an extra heavy duty shock absorber in a conventional suspension system. However, it finds a slightly different use in this invention.

Mounted to the back of the solid beam front axle 3 is a set-off support and bracket 10. The set off is necessary in order to allow room in the space for the additional components needed for this invention. The set-off support and bracket 10 can be bolted or welded directly to the solid beam front axle 3. As shown, the set-off support and bracket 10 can be solid steel or it can be a hollow, tube of steel with sufficient strength to support the brackets 11 associated with it. The brackets 10 can be welded onto, the set-off support and bracket 10, or, the set-off support and bracket 10 can be made adjustable for purposes of the shock absorber 13 attached to it by manufacturing holes 28 in the side wall 12 of the set-off support and bracket 10 whereby, the brackets 11 can be attached to the set-off support and bracket 10 using pass through bolts (not shown).

The brackets 11 of the set-off and support bracket 10 are mounted on each side wall 12 of the set-off support bracket 10 to form a clevis. The lower end 14 of the extra heavy duty shock absorber 13 is pivotally mounted in the clevis using a bolt 15. The extra heavy duty shock absorber 13 of this invention is at least 3 inches in diameter and at least 24 inches long.

There is a compression bump stop 17 mounted in the suspension shroud 9 using the mounting hole 18 (FIG. 4) used for the initial shock absorber of the chassis.

The bottom 29 of the compression bump stop 17 has a rubber end 19, which has high Durometer useful in absorbing bumps and jolts, from the road. Note that the compression bump stop 17 is not a full hydraulic piston; it is compression only, and is operated normally on gas or hydraulic fluid to provide the predetermined compression. Commercial varieties of such stops can have a compression of from about 100 to about 300 psi.

The bottom 29 of the compression bump stop 17 rests on the metal plate 7 mentioned Supra. The metal plate 7 is configured such that one end 20 rests between the top 21 of the front axle 3 and the bottom 22 of the extra heavy duty coil spring 2 and the opposite end 23 rests on top of the set-off support and bracket 10 and beneath the bump stop rubber end 19.

The top end 24 of the heavy duty shock absorber 13 is pivotally attached to brackets 25 that form a clevis. The brackets 25 are fixedly attached to a shock absorber mounting plate 26, that is bolted or welded to the top beam 5 using a bolt 27.

Because of the uniqueness of the set-off support and bracket 10, all of the components are able to fit within the close space normally occupied by a conventional shock absorber and coil spring.

Figure 2:
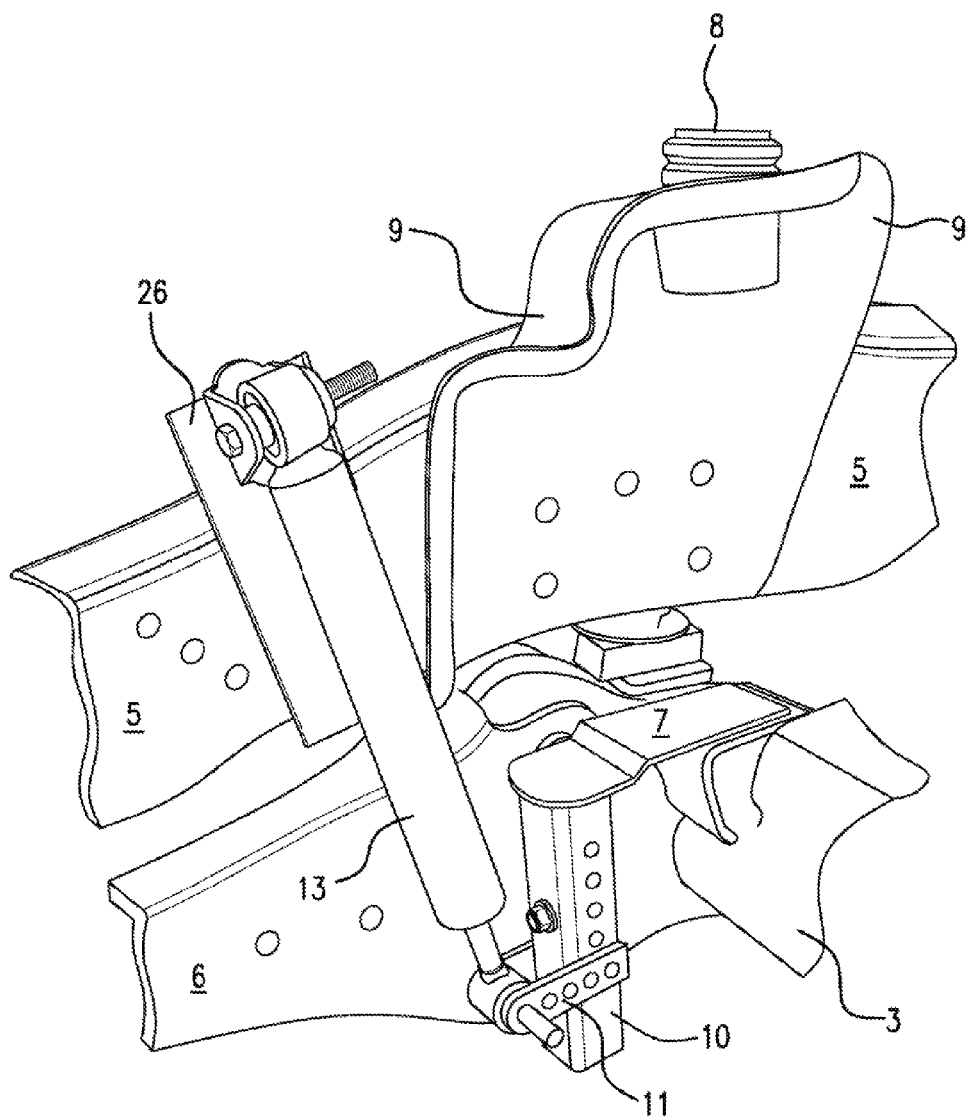
FIG. 2 is side view of a portion of the assembly showing the extra heavy duty shock absorber, set-off support and bracket and top plate absent the extra heavy duty compression bumper stop and the extra heavy duty coil spring.

FIG. 2 shows the assembly without the extra heavy duty coil spring 2 and the compression bump stop 17 such that there is shown, for example, the suspension shroud 9 bolted to the top beam 5. Also shown is the relationship of the pivotable beam 6, the solid beam front axle 3, the set off support and bracket 10 and the extra heavy duty shock absorber 13.

Figure 3:
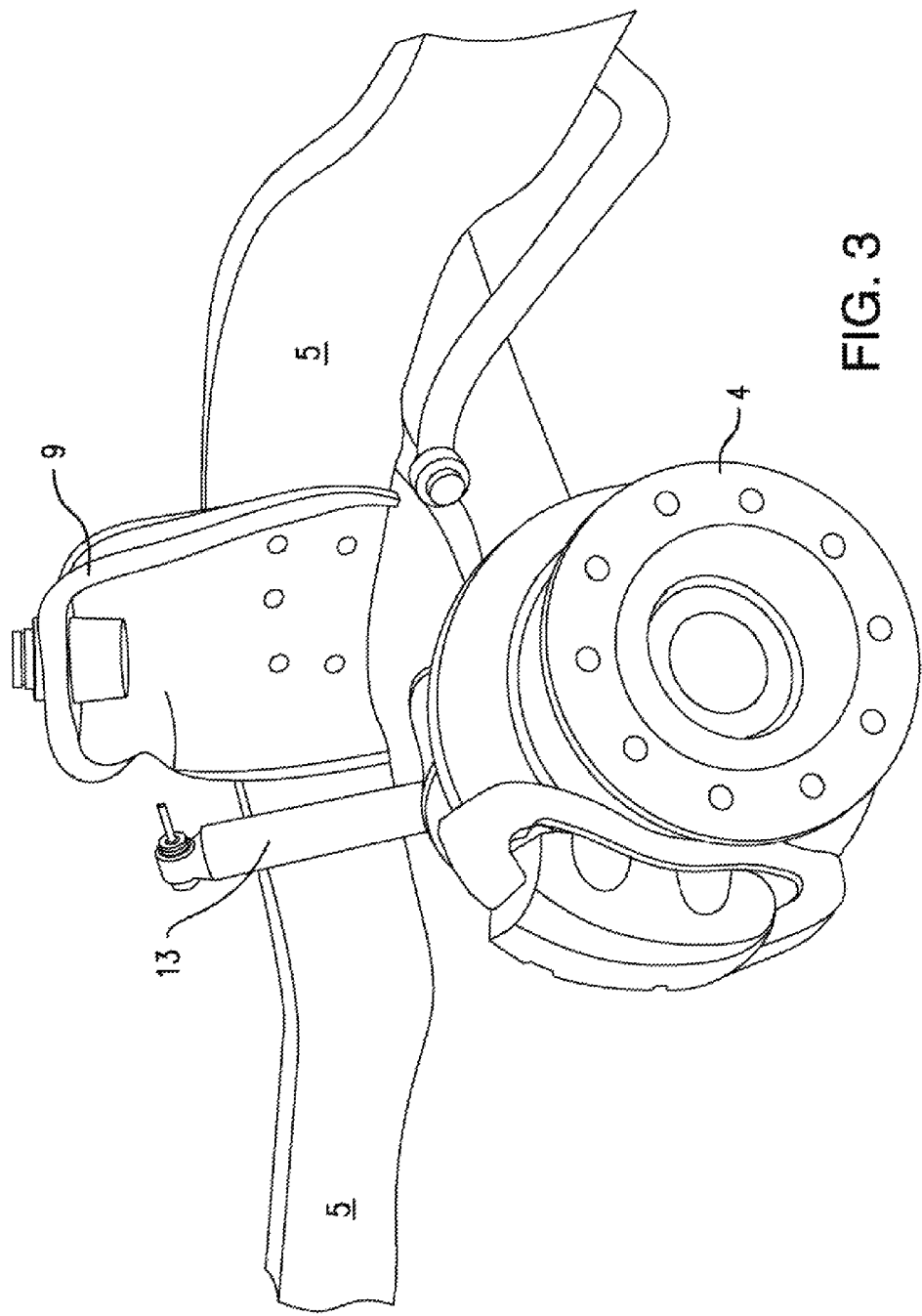
FIG. 3 is a side view of a portion of the assembly showing the extra heavy duty shock absorber and its alignment with the suspension hood and solid beam front axle as represented by the wheel.

FIG. 3 is a side view of the assembly 1 without the extra heavy duty coil spring 2, the compression bump stop 17, and the lower beam 6 in order to show the relationship of the shroud 9, the solid beam front axle 3, the top beam 5, and the wheel 4.

Figure 4:
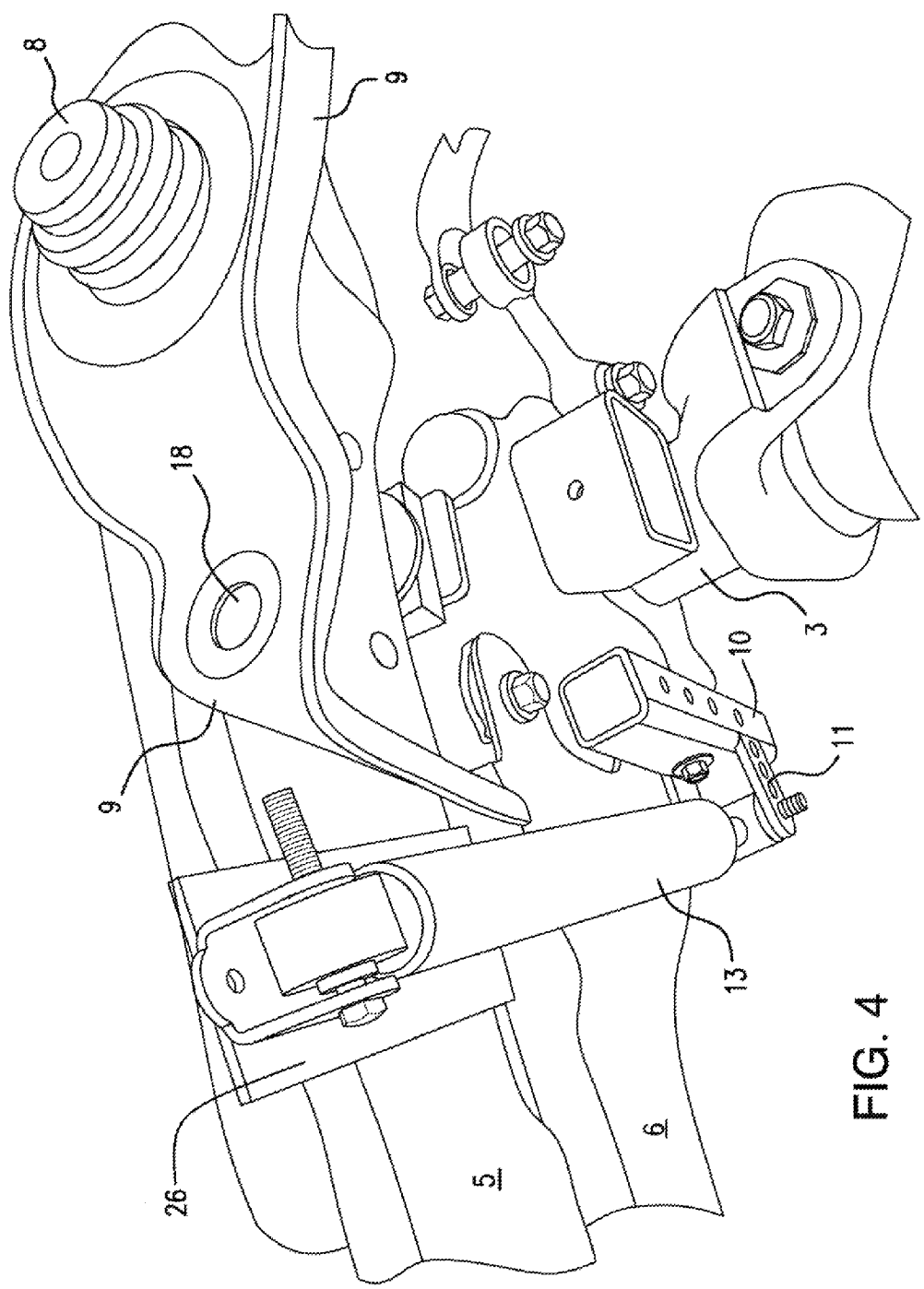
FIG. 4 is top view of a portion of the assembly showing the extra heavy duty shock absorber, set-off support and bracket and the solid beam front axle with wheel attached.

FIG. 4 is a top view showing the heavy duty shock absorber 13, the brackets 11 and, the set-off support and bracket 10, the solid beam front axle 3, the wheel 4, the suspension shroud 9, the opening or hole 18 for the top of the compression bump stop 17 mounting.

What is claimed is:

1. A refurbishment assembly for heavy duty chassis for heavy duty trucks, said refurbishment assembly comprising in combination:
   i. an extra heavy duty coil spring;
   ii. an extra heavy duty shock absorber having a near end and a distal end, said extra heavy duty shock absorber being pivotally mounted at said near end to a rigidly mounted, set-off support and bracket, said set-off support and bracket having a top end, said distal end of said heavy duty shock absorber being pivotally mounted to support bars, said support bars being rigidly mounted to a support plate, said support plate being rigidly mounted to a top chassis beam of a heavy duty truck chassis;
   iii. a dampener plate having a near end and a distal end, said dampener plate surmounting, at said near end, the top of said set-off support and at said distal end surmounting a truck solid beam front axle and beneath one end of said heavy duty coil spring;
   iv. an extra heavy duty compression bump stop, said extra heavy duty extra heavy duty compression bump stop impinging on a top surface of said dampener plate at said near end, the opposite end of said extra heavy duty bump stop being securely mounted to a suspension hood of a heavy duty chassis, said suspension hood being rigidly mounted to said top chassis beam of a heavy truck chassis;
   v. a lower heavy duty chassis beam having a near end and a distal end, said near end being pivotally attached to said top chassis beam, said distal end being rigidly attached to said solid beam front axle.

2. A kit for refurbishing a heavy duty chassis for heavy duty trucks, said kit comprising:
   a. an extra heavy duty coil spring;
   b. an extra heavy duty shock absorber having a near end and a distal end, said extra heavy duty shock absorber being pivotally mounted at said near end to a rigidly mounted, set-off support and bracket, said set-off support and bracket having a too end, said distal end of said heavy duty shock absorber being pivotally mounted to support bars, said support bars being rigidly mounted to a support plate:
   c. a dampener plate having a near end and a distal end, said dampener plate surmounting, at said near end, the top of said set-off support;

d. an extra heavy duty bump stop said extra heavy duty extra heavy duty compression bump stop impinging on a top surface of said dampener olate at said near end.

3. A method of converting a heavy duty truck chassis to a fortified heavy duty truck chassis, the method comprising:
   a. supporting a top beam of a heavy duty chassis at a predetermined height;
   b. supporting a lower beam of a heavy duty truck chassis such that it can be raised or lowered relative to the height of said top beam, said lower beam having attached thereto a solid beam front axle of a heavy duty truck;
   c. removing any coil spring in said heavy duty chassis;
   d. removing any shock absorber in said heavy duty chassis;
   e. providing a set-off support and bracket and rigidly mounting said set-off support and bracket to a predetermined position on said axle;
   f. providing a mounting plate for an extra heavy duty shock absorber, said mounting plate rigidly mounted on said upper beam such that there is a predetermined alignment with said set-off support and bracket;
   g. providing an extra heavy duty bumper stop and mounting said extra heavy duty bumper stop on a suspension hood of said top beam in the position that was occupied by any initial shock absorber,
   h. placing one end of a mounting plate on a top of said set-off support and bracket and the opposite end on said top of said solid beam front axle;
   i. mounting an extra heavy duty coil spring on the opposite end of said mounting plate and in said suspension hood in place of said initial coil spring;
   j. mounting said extra heavy duty shock absorber on said set-off support and bracket and mounting the opposite end of said extra heavy duty shock absorber on a mounting plate on said top beam such that said extra heavy duty shock absorber is aligned in a predetermined manner with said extra heavy duty coil spring.

\* \* \* \* \*